United States Patent [19]

Hargraves

[11] 3,990,967

[45] *Nov. 9, 1976

[54] POSITIVE PROGRESSIVE BIOCHEMICAL DIGESTION OF ORGANIC WASTE

[76] Inventor: William J. Hargraves, 121 Lake Highlander, Dunedin, Fla. 33528

[ * ] Notice: The portion of the term of this patent subsequent to July 31, 1990, has been disclaimed.

[22] Filed: Jan. 22, 1973

[21] Appl. No.: 325,732

Related U.S. Application Data

[63] Continuation-in-part of Ser. Nos. 813,242, April 3, 1969, abandoned, Ser. No. 134,968, April 19, 1971, Pat. No. 3,780,997, Ser. No. 135,352, April 19, 1971, Pat. No. 3,776,383, and Ser. No. 135,353, April 19, 1971, Pat. No. 3,749,246.

[52] U.S. Cl. ................................. 210/14; 210/15; 210/194; 210/220; 210/259
[51] Int. Cl.² ....................... C02C 1/08; C02C 5/10
[58] Field of Search ............ 210/63, 199, 201, 205, 210/207, 208, 209, 218, 221, 322, 539, 252, 532, 336, 301, 14, 15, 7, 194, 220, 259; 4/115, 116, 10

[56] References Cited
UNITED STATES PATENTS

| | | | |
|---|---|---|---|
| 744,193 | 11/1903 | Hammond | 210/336 |
| 1,902,171 | 3/1933 | Kopp | 210/301 |
| 3,054,602 | 9/1962 | Proudman | 210/201 |
| 3,074,076 | 1/1963 | Kersten | 4/116 |
| 3,133,017 | 5/1964 | Lambeth | 210/221 |
| 3,423,766 | 1/1969 | Eger | 4/115 |
| 3,666,106 | 5/1972 | Green | 210/201 |
| 3,749,246 | 7/1973 | Hargraves | 210/221 |
| 3,776,383 | 12/1973 | Hargraves | 210/199 |

Primary Examiner—Charles N. Hart
Assistant Examiner—Ernest G. Therkorn
Attorney, Agent, or Firm—Cushman, Darby & Cushman

[57] ABSTRACT

An aerobic sewage treatment system is constructed of a plurality of series-connected turbulent, aerated stages which progressively purify the waste to essentially organic-free water without building up sludge. The system is especially suitable for a compact toilet, such as a toilet on a pleasure boat or recreational vehicle. Discharge of effluent can be avoided by evaporation of water from the system by venting the stages and if necessary by heating the effluent from the last stage.

13 Claims, 14 Drawing Figures

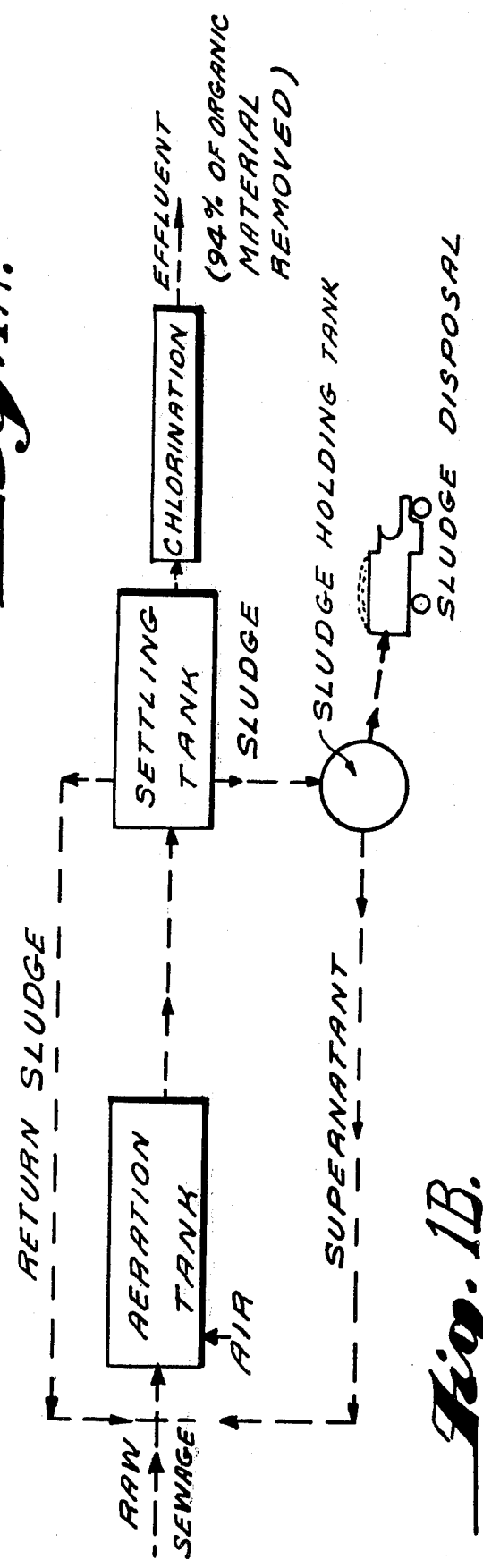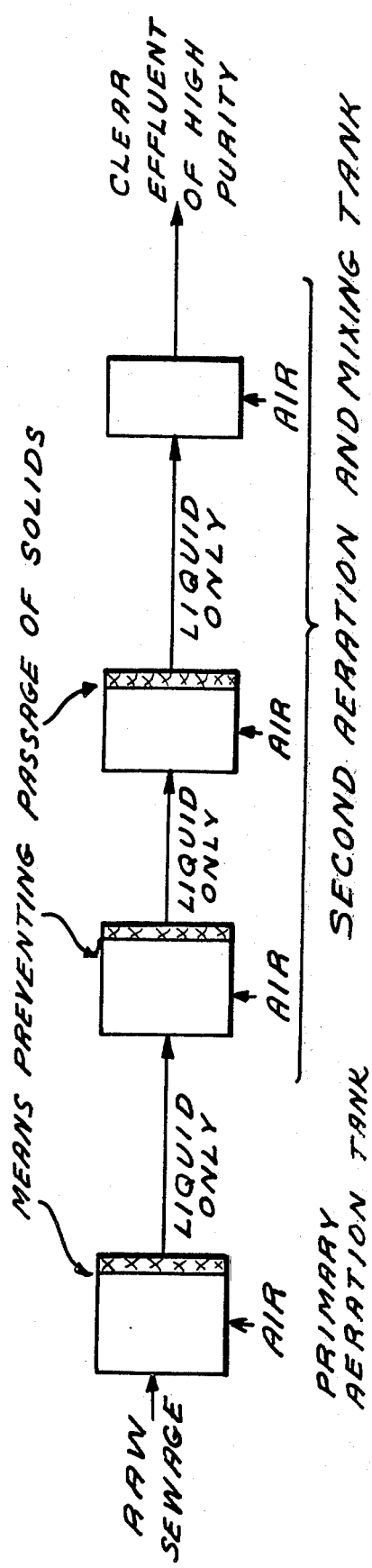

POSITIVE PROGRESSIVE BIOCHEMICAL DIGESTION OF ORGANIC WASTE

This is a continuation-in-part of applications Ser. No. 813,242, filed Apr. 3, 1969 (now abandoned), Ser. No. 134,968, filed Apr. 19, 1971 (U.S. Pat. No. 3,780,997), Ser. No. 135,352, filed Apr. 19, 1971 (U.S. Pat. No. 3,776,383) and Ser. No. 135,353, filed Apr. 19, 1971 (U.S. Pat. No. 3,749,246).

BACKGROUND OF THE INVENTION

This invention relates to biochemical digestion of organic waste material and in particular to systems and methods suitable for compact toilets.

The broad principles of aerobic and anerobic digestion or sewage, organic factory waste and other organic matter dispersed in or dissolved in water have been recognized for many years. The removal of organic material is effected by the feeding and multiplication of microorganisms within the organic material. A typical sewage treatment system of the aerobic digestion type, usually referred to as an activated sludge process, consists in oversimplified form of an aeration stage and a settling stage. In the aeration stage raw sewage is aerated to promote rapid growth of microorganisms. The biochemical reactions which occur convert most of the organic material to volatile compounds, primarily carbon dioxide and water simultaneously with the formation of sludge. In practice the process is operated continuously, the raw sewage flowing into one end of an elongated aeration tank and along the length of the tank as a moving stream. A sludge-liquid mixture flows from the downstream end of the aeration tank to the settling stage which is simply a quiescent settling tank. After settling the sludge is withdrawn from the settling tank and a portion thereof is returned to the aeration tank to inoculate the incoming raw sewage with microorganisms and to thereby stimulate rapid synthesis of new organisms. The supernatant liquid, or effluent, is discharged to waste, usually after chlorination. Actual treatment plants are of course more complex than the above summary, although the principles of operation are the same.

While the principles of biochemical degredation of organic waste are well recognized, the biochemical processes themselves in an operating treatment plant of the above type are highly complex and are affected by any of several variables within the system. A properly operating system will produce rapidly settling sludge and a clear effluent substantially free of organics, but the system can rather rapidly become biochemically unbalanced in which case it can discharge pollution in the form of undigested waste, floating colonies of microorganisms and/or unsettled sludge.

BRIEF DESCRIPTION OF PRIOR ART

Although a large number typical aerobic sewage treatment systems operate as summarized above, many modifications have been suggested in the prior art, aimed at improving the efficiency of the conversion and/or reducing the size, complexity and cost of the system. One such conventional system is illustrated schematically in FIG. A which is discussed hereinafter.

No attempt is made herein to characterize the many modifications of the basic system which have been suggested. It may be helpful, however, to refer to Gordon U.S. Pat. No. 2,666,740 and Wagner et al. U.S. Pat. No. 3,260,368 because these patents disclose in common with the present invention the use of plural sequential treatment stages, although the stages do not provide the special treatment conditions which distinguish the present invention. Reference is also made to Cambell et al. U.S. Pat. No. 3,135,686 and to Boester U.S. Pat. Nos. 3,440,669, 3,210,053 and 3,051,315 because these patents disclose, in common with the present invention, organic waste treatment systems which have particular utility for processing the sewage from a source of rather limited volume, such as a single toilet or a single household.

PRELIMINARY DISCUSSION AND SUMMARY OF THE INVENTION

So far as the applicant is aware all of the aerobic digestion systems heretofore designed to consume organic waste must deal with the following vexing problems: (1) a tendency for the biochemical action to become unbalanced with the result that the system discharges a highly polluted effluent which contains undigested waste, floating colonies of microorganisms and/or unsettled sludge, (2) obtaining a high degree of purity in the effluent even under optimum operating conditions, (3) processing the sludge by operations which include not only final disposal of the sludge but also intermediate steps such as recycling, storage, dewatering and digestion, and (4) treatment and disposal of the effluent.

As an example of a conventional system which the applicant regards as having some structural and operational features in common with the system of the present invention reference is made to FIG. 1A which is a schematic flow diagram of a system known in the art as an extended aeration system. This type of system is characterized primarily by a relatively long aeration period (usually about 24 hours in contrast to 4–8 hours in a "standard" activated sluge system) and by a return of a large proportion of the sludge from the settling tank to the aeration tank. Under optimum conditions there is relatively little excess sludge which must be treated and disposed of. However the fact that excess sludge is produced requires both a sludge-holding tank and equipment for returning sludge to the aeration tank and for disposing of the excess. Therefore the system reduces the magnitude of problem (3) referring to above but does not completely solve the problem. In addition the system must still deal with problems (1), (2) and (4).

The present invention is based on the applicant's discovery that complete or substantially complete digestion of organic waste by biochemical action, without the production of excess sludge, can be obtained by a progressive step-wise biochemical treatment carried out sequentially in a series of special treatment zones each of which is highly aerated and turbulent. Summarized very briefly the technique is characterized by the retention of organic solids (that is settleable solids and floating solids) in the first treatment chamber, or main digestion chamber, and passing only liquid and liquified solids to the next treatment stage where further biochemical purification takes place, and so on through the other stages until substantially waste-free liquid is obtained without a build-up of sludge or other degradation products. A system incorporating these principles is illustrated in FIG. 1B in schematic and simplified form.

It is important that raw sewage solids be retained in the main digestion stage rather than being permitted to pass to the next stage and so on to the rest of the stages. The purpose of this feature is to prevent a solid sewage particle from passing rapidly to, say, the last stage where it would introduce substantial pollution, thereby destroying the purity of that stage. When the solids are held in the main stage, the liquid in each subsequent stage becomes more highly purified than the next previous stage, and it can easily be visualized that a solid sewage particle suddenly introduced into a downstream stage will raise the pollution level in that stage. Since the progressive digestion technique requires continuous aeration, agitation and suspension of all solids in each stage, such solids would be free to pass readily from stage to stage unless some means is provided to prevent their passage. The present invention employs either filters or quiet (settling) chambers for this purpose, the latter being preferred because they are not subject to clogging. Since it is not desired to allow settling solids to collect, the quiet chambers are constructed to continuously return any settled solids to the upstream digestion chamber.

The solids referred to above are those which would normally settle in quiescent liquid or which would float on the liquid in the form of foam or scum. The term is not intended to include colloidal particles and individual microorganisms although it does include large flock particles. As is known in the aerobic digestion art one of the biochemical steps by which organic matter is chemically oxidized results in the formation of small dispersed particles known as flock. Flock particles tend to increase in size from microscopic to particles visible to the eye, and it is these latter particles which are settlable.

It has been found that such a system can be operated in a manner which substantially solves all of problems (1), (2), (3) and (4) referred to above. The system operates with little or no tendency to become biochemically unbalanced and it produces an effluent from which 99% or more of the organic waste has been removed. Of equal or even greater importance is the elimination of sludge processing equipment, because this produces a number of advantages over a conventional activated sludge system. There is of course the initial advantage of reduced costs of construction and operation.

A more significant advantage resulting from elimination of sludge processing equipment is that the system becomes so simple in construction and operation that it can be used in environments where a conventional activated sludge system has been impractical or prohibited by law. One such special use is as a compact toilet facility which has been found to be extremely well-adapted for use in a pleasure boat, or travel trailer, or at public places such as a golf courses, or for a private residence. In the simplist most compact arrangement the toilet facility is designed to receive raw waste with little or no diluting water, although the treatment stages themselves will contain water as the medium in which the biochemical action proceeds. A complete facility may contain no more than 15 gallons of liquid, yet due to the progressive purification which is obtained as the waste passes sequentially through the several stages, the facility is capable of serving many more persons that would a conventional activated sludge system of the same volume. Added to this is the fact that no sludge accumulates in the system, so that essentially the only maintenance required is the continuous supply of air to the treatment stages.

The compact toilet facility summarized above can also be operated in a manner to produce no effluent. This is a decided advantage in, for example, pleasure boats due to the increasingly rigid prohibitions being enacted against discharge of waste from such craft. At the present time the only discharge-free boat toilets known to the applicant are those which merely store the toilet contents, with mineral chemical treatment, until the toilet can be pumped out at dock side into another container. The present invention, however, provides for sufficient evaporation from the treatment stages to balance the liquid input, either by natural evaporation into an air sweep and/or by heating a portion of the contents.

BRIEF DESCRIPTION OF THE DRAWINGS

FIG. 1A is a schematic flow diagram of a known activated sludge waste treatment system of the extended aeration type;

FIG. 1B is a comparative schematic flow diagram, in simplified form, of a waste treatment system constructed according to the present invention;

Referring to FIGS. 1 and 2 there is shown in simplified form a simple, compact portable toilet facility 10 embodying many of the broad principles of the present invention. In this emobidment five digestion stages 12, 14, 16, 18 and 20 are arranged one behind the other as a unitary structure, the latter being defined by side walls 22, 24, end walls 26, 28 and a top and bottom wall 32 and 34. A conventional hinged toilet seat 35 is mounted directly on the top wall above the main digestion chamber 12.

Figure 1:
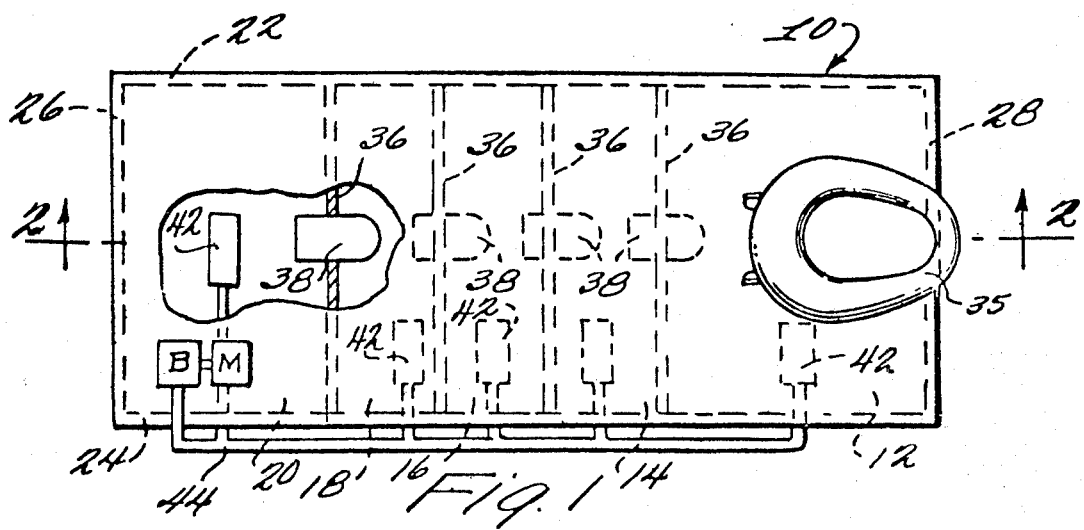
FIG. 1 is a simplified plan view of a portable toilet facility which includes a waste treatment system embodying the principles of the present invention.

The digestion chambers are defined by transverse partitions 36 extending between the side walls 22 and 24, and each chamber is connected to the next chamber through a tubular conduit 38. Each conduit 38 extends upwardly from near the bottom of its respective chamber and then longitudinally through the partition 36 into the upper part of the next chamber. The lower end of each conduit 38 is provided with a filter 40, which may be a piece of woven fiberglass fabric wrapped and secured around the end of the conduit 38. The filters 40 face downwardly so that solid matter, if present, will tend to fall away from the filters. Preferably the upper end of each successive conduit 38 is located slightly below the conduit 38 in the preceding stage, with the result that the liquid level in each stage is slightly below that in the preceding stage.

Filters are shown between each of the successive stages, and these filters perform generally the same function as the first filter, although under ordinary circumstances there will be no dispersed raw sewage solids in these stages.

It is essential that the contents of each of the digestion chambers be thoroughly aerated and mixed. In the interest of simplicity of illustration there is shown a simple air diffusion device in the form of a porous ceramic tube 42 or air stone. Each diffuser 42 receives a supply of compressed air from any suitable supple device such as an manifold 44 which is supplied with air from a motor driven blower 46 mounted on top of the facility 10. The diffuser 42 in the main digestion chamber is disposed below a screen 48 or similar structure which prevents solids from settling on the bottom of the chamber 12. In order to aid in preventing clogging of the filters 40, in the event that solids are present, the diffusers 42 may be located directly below the filters, or additional filters (not shown) may be provided.

Figure 2:
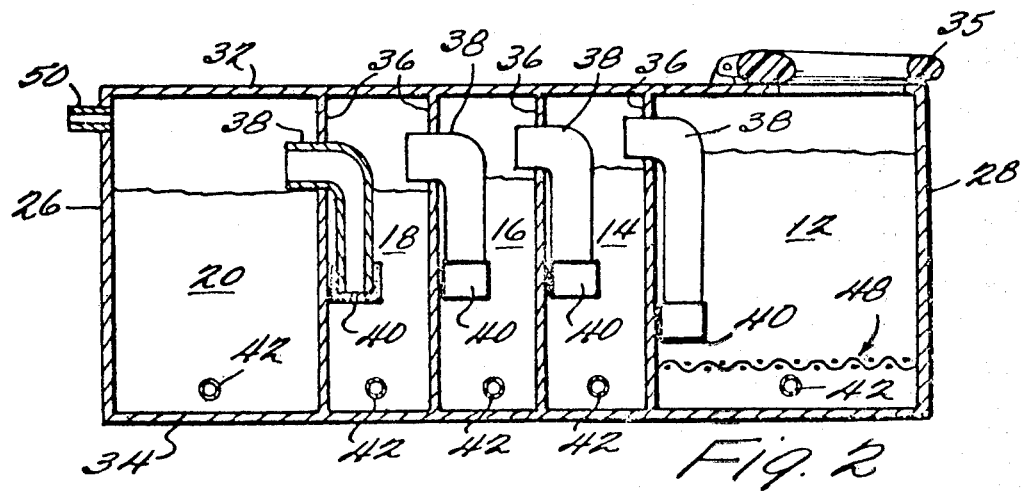
FIG. 2 is a sectional view taken on the line 2—2 of FIG. 1.

The embodiment illustrated in FIGS. 1 and 2 is a closed circuit type of toilet facility in that under ordinary circumstances there is no flow of effluent from the last stage 20, although an overflow outlet 50 may be provided above the normal liquid level in that stage. In operation it is contemplated that the liquid levels in the various stages will rise and fall but that no excessive throughput will require a permanent overflow system. In fact, evaporation may reduce the liquid levels in the stages to the extent that it is necessary to add additional water. It will be appreciated that this construction is the simplest and most compact and can be employed as a portable toilet facility where no running water is available. As described previously this basic arrangement can be modified by incorporating it within a booth or the like to serve as a portable toilet facility for a construction site or similar location. Further, a toilet bowl of suitable construction can be provided, and flushing water can be pumped from one of the digestion stages.

A typical portable toilet facility embodying the principles of the embodiment of FIGS. 1 and 2 might have, for example, a total liquid capacity of about 50 gallons divided among the main digestion stage 12 and the secondary digestion stages, the main stage 12 having a liquid capacity equal to or slightly greater than that of any one of the secondary stages. Ordinarily at least three or more secondary stages are required, although under some circumstances two may suffice. If one assumes an input of waste to the main stage 12 of 1 quart per day per person and use of the 50-gallon facility by 20 persons, the average input is 5 gallons per day, and the theoretical hold-up time for each increment of volume passing through the system is 10 days. If a single 50-gallon digestion chamber were employed, the theoretical hold-up time would of course be the same. However, as a practical matter it would be virtually impossible to prevent overall mixing in a single, aerated, agitated chamber of this small size with the result that raw solid sewage particles and/or insufficiently treated liquid would find their way to the effluent discharge point thereby contaminating the effluent at that point.

By effective filtering between the main digestion chamber 12 and the first secondary chamber 14 and by providing a plurality of secondary chambers all solids are retained in the main chamber and mixing of insufficiently treated liquid from an early stage with liquid in or near the last stage is positively prevented. That the retention of solids in the main stage is critical for success of the system is evident from the fact that paper, for example, is more slowly digested than liquid waste and must not be permitted to pass into subsequent chambers until it has been degraded from a solid state. Liquid and very fine particles which are passed from chamber to chamber are more rapidly digested than true solids so that each subsequent chamber purifies its contents to a greater degree. Also, surges in the system which might cause mixing are substantially eliminated by the frictional resistance to liquid flow provided by sequential connection of the chambers. That is, an increase in the liquid level in the main chamber 12 resulting from the deposition of waste thereinto produces flow into the next chamber 14 only at a relatively slow rate, and sequentially into the next chamber 16 at a relatively slow rate and so on through the series of chambers. At the same time the conduit connections 38 will pass liquid at a rate which is proportional to the difference in liquid level in two adjacent stages so that a rapid increase in liquid level in the main stage 12 will be compensated for by a faster flow out of that stage to prevent flooding.

Figure 3:
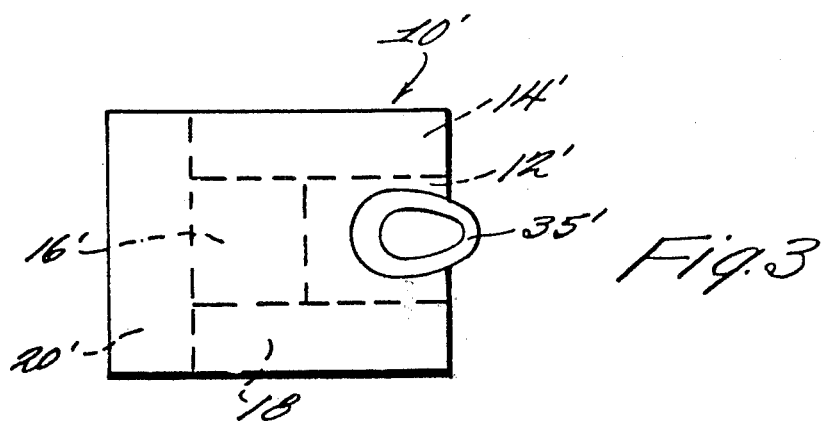
FIG. 3 is a schematic plan view of portable toilet facility having the digestion chambers arranged in a pattern different from that in FIG. 1.

FIG. 3 illustrates in schematic form a similar closed circuit toilet facility 10' in which the digestion chambers 12', 14', 16', 18' and 20' are arranged in a different pattern, so that the overall shape of the facility in plan view is approximately square. It will be appreciated that the various digestion chambers can be arranged in any pattern to fit the space into which the facility is to be fitted. If necessary pumps may be installed between stages, if the stages cannot be arranged for gravity flow.

Figure 5:
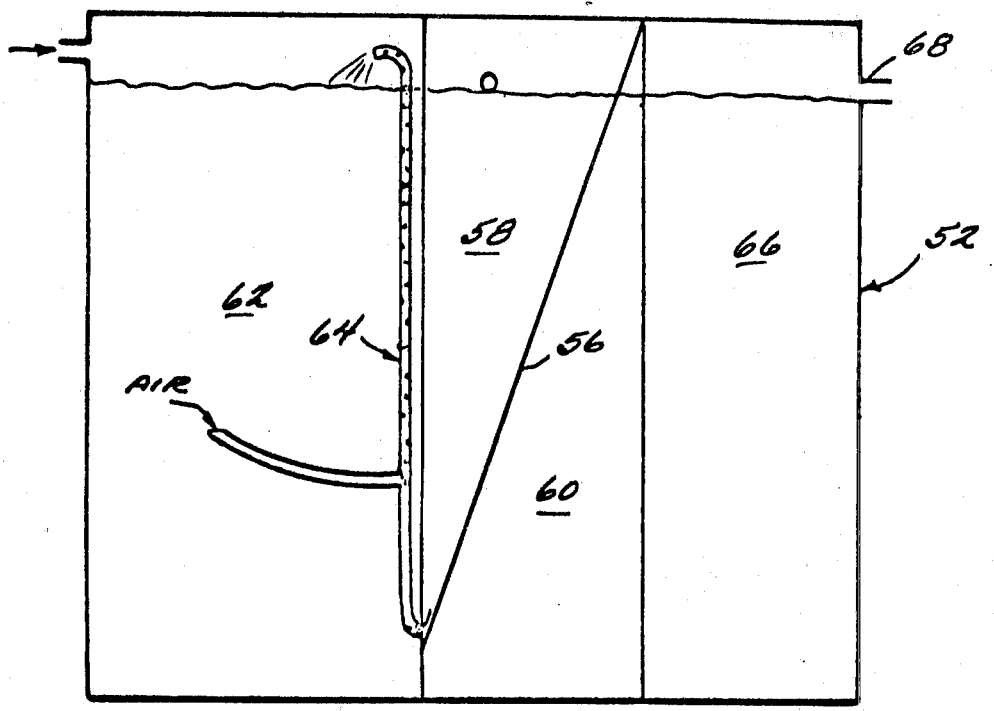
FIG. 5 is a sectional view taken on the line 5—5 of FIG. 4.
Figure 4:
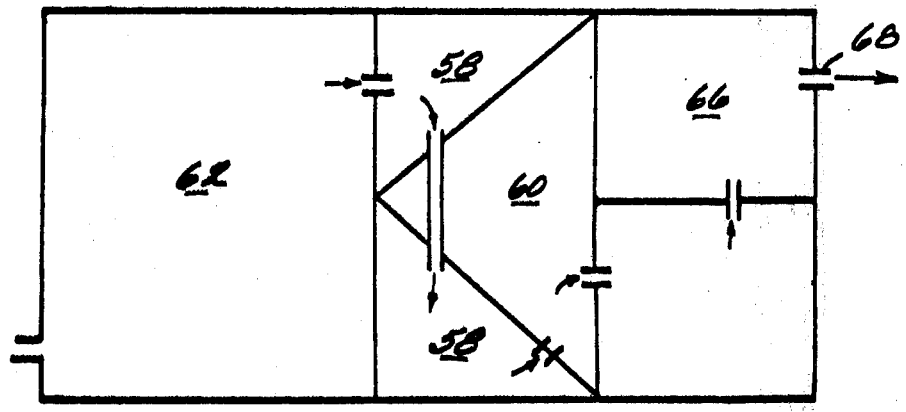
FIG. 4 is a schematic plan view of a digester suitable for treating the sewage from a single family house.

In FIGS. 4 and 5 there is illustrated schematically a digester 52 suitable for treating all the sewage from a single family house or the like. In this embodiment the first secondary digestion stage 54 is provided with two inclined partitions 56 which divide the chamber into two small flock chambers 58 and a larger aeration chamber 60. The flock chambers 58 are quiescent with the result that any particulate matter therein, such as flock, settles to the apex of the chambers 58. The settled material is then returned to the main digestion chamber 62 by any suitable means, such as an air lift 64 which receives its air supply from the diffuser air supply. The total liquid capacity of the digester 52 may be, for example, 900 gallons. In the interest of simplicity of illustration the flow connections between the main digestion chamber and the first flock chamber and between the remaining chambers are not shown in detail, and the air diffusers are omitted entirely. It will be understood that the flow connections are generally the same as those illustrated in FIGS. 1 and 2.

The effluent which is displaced from the final digestion stage 66 by sewage entering the main stage 62 is conducted from an effluent outlet 68 to a suitable discharge area or to a holding tank for subsequent use. The holding tank (not shown) will generally be aerated in the same manner as the digestion chambers in order to prevent the liquid from stagnating.

Figure 6:
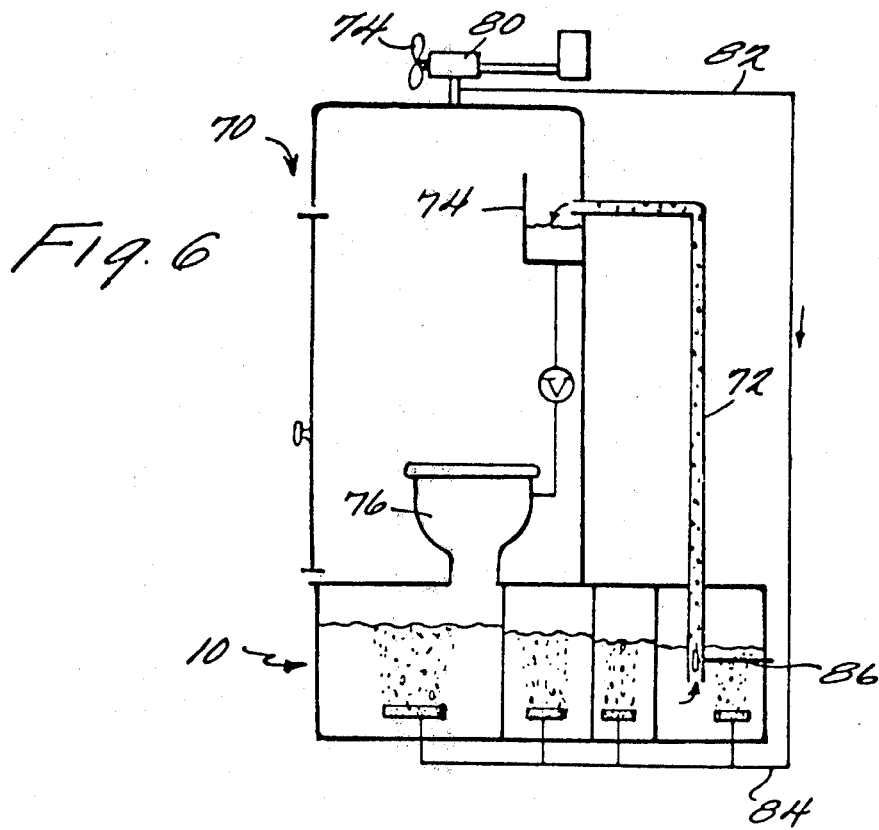
FIG. 6 is a schematic vertical sectional view of another toilet facility.

In FIG. 6 there is illustrated schematically an enclosed toilet facility 70 which embodies several additional features over and above the basic digestion system. The latter may be the system 10 illustrated in FIGS. 1 and 2 modified to permitt purified water to be withdrawn from the last digestion stage 20, as by an air lift 72, for delivery to an elevated holding tank 74. The water in the holding tank 74 may subsequently be used for flushing the toilet 76 which is mounted on top of the digestion system 10. Also, in this embodiment, there is illustrated schematically a wind-driven air supply system, the system including a directional windmill 78, an air pump 80 mechanically driven by rotation of the windmill 78 and appropriate air lines 82, 84 and 86 for delivering air to the diffusers 42 and to the air lift 72.

Figure 6A:
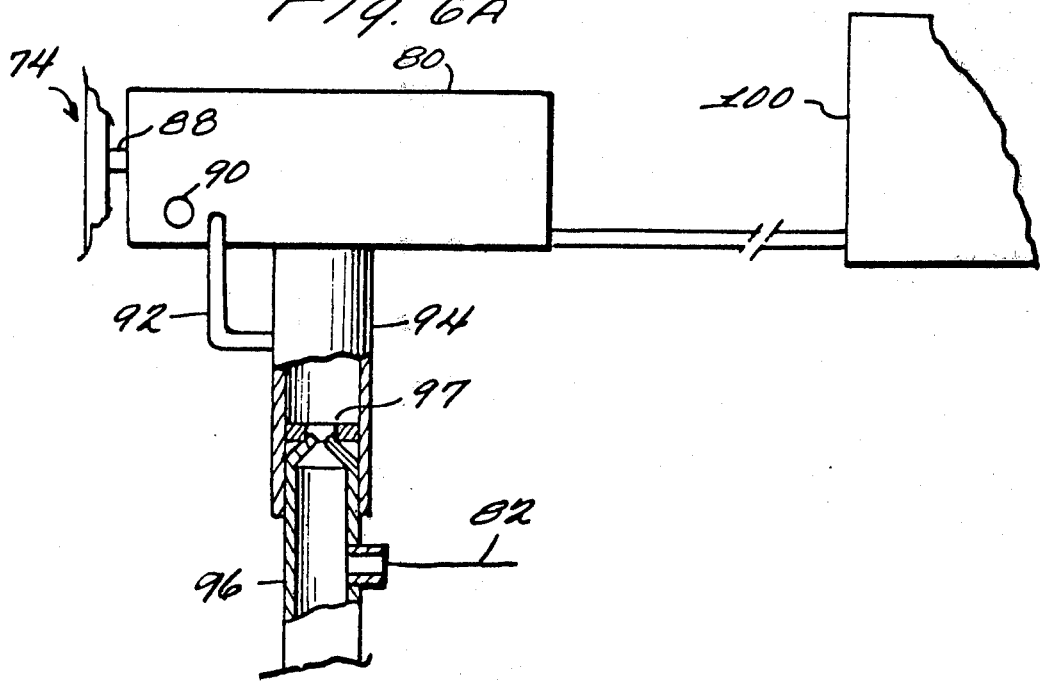
FIG. 6A is a fragmentary elevational view illustrating the wind-driven air pump of FIG. 6.

FIG. 6A illustrates the mounting of the windmill-air pump combination. The pump 80 may be of conventional construction operated by a rotating drive shaft 88 by the action of the wind on the blades 74. Air is sucked in through an inlet 90 and discharged through a tube 92 into a sleeve 94 fixed to the pump 80. The sleeve 94 of rotatably mounted on a fixed tube 96 the upper end of which is tapered and in sliding engagement with a pivot seat secured in the tube 94. A bushing guide 98 is provided between the lower end of the tube 94 and the exterior of the tube 96. In operation the wind acting on a tail fin 100 turns the pump assembly about the axis of the tubes 94 and 96.

Figure 7:
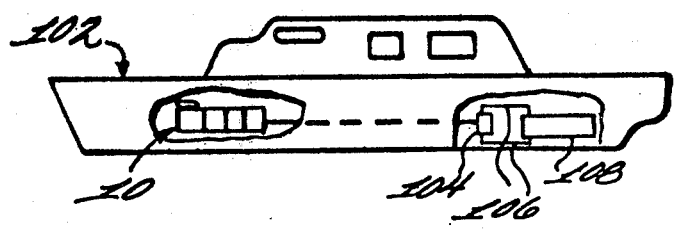
FIG. 7 is a schematic elevational view of a pleasure boat provided with a toilet facility.

FIG. 7 illustrates in schematic form a vehicle in the form of a pleasure boat 102 having arranged in the hull a toilet facility 10 embodying the principles of the present invention. The toilet facility 10 may be of the type illustrated in FIGS. 1 and 2 and, as shown, it is modified to the extent that liquid from the last stage 20 is conducted to a heat exchanger 104 for the purpose of evaporating excess water. As shown, engine cooling water or engine exhaust can be circulated through a suitable pipe 106 from the engine 108 to the heat exchanger 104.

FIGS. 8-11 illustrate a preferred toilet construction 200 in which special quiet chambers are employed rather than filters for retaining solids in the various treatment stages. These Figures also illustrate a preferred internal baffle arrangement which efficiently aerates and agitates the contents of each stage.

Figure 8:
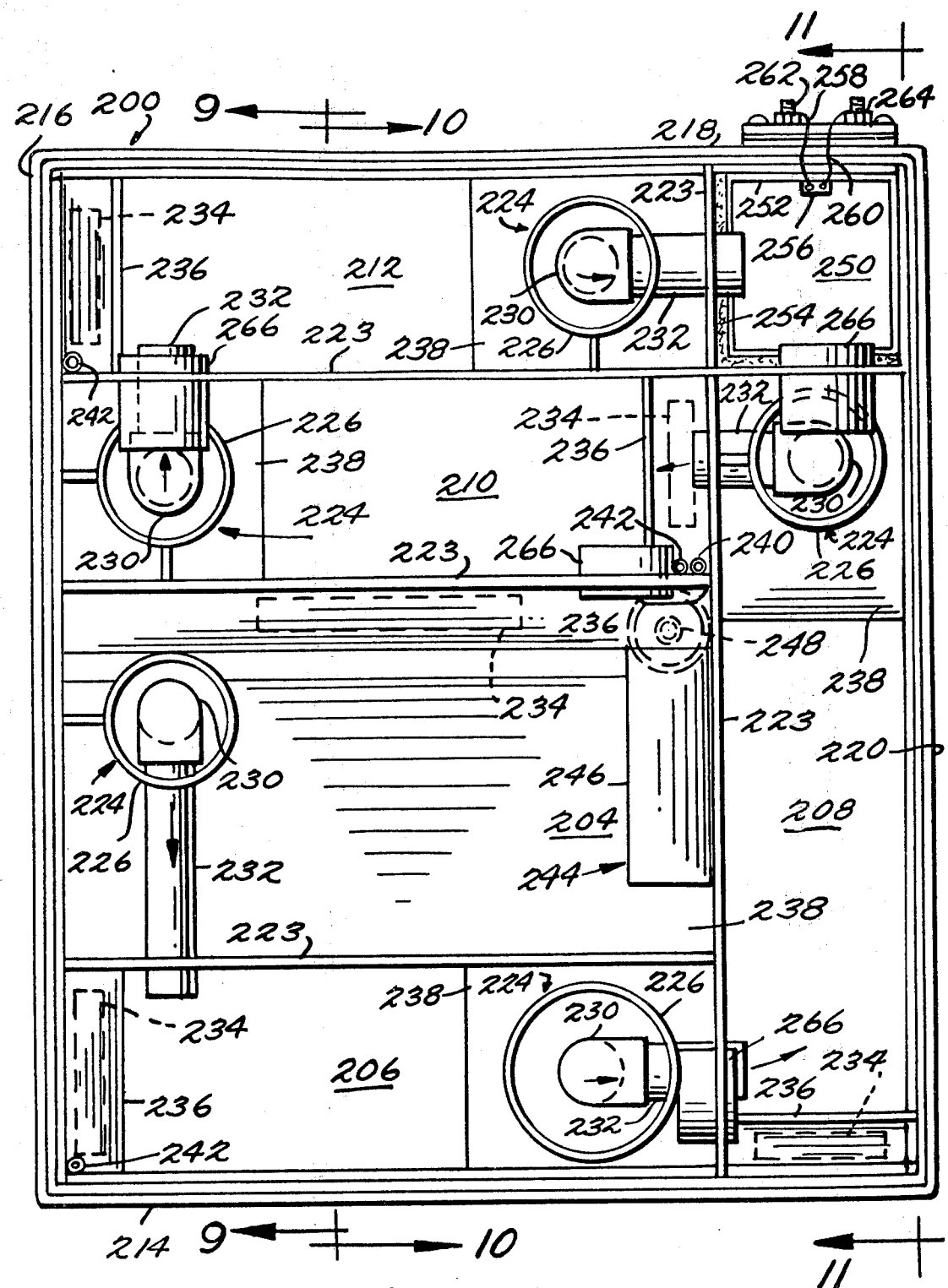
FIG. 8 is a plan view of a further embodiment of a toilet facility.
Figure 9:
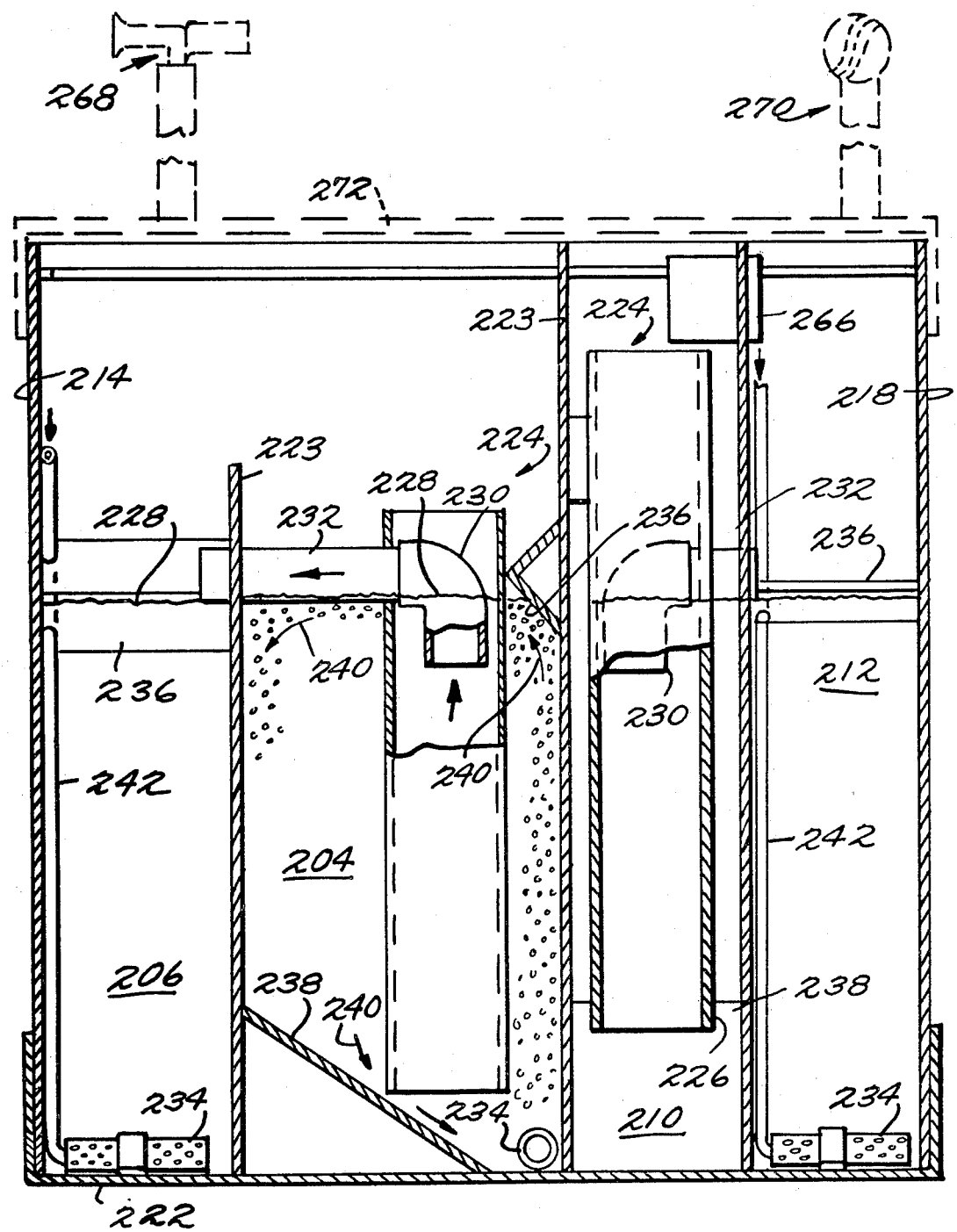
FIG. 9, 10 and 11 are sectional views taken on the lines 9—9, 10—10 and 11—11, respectively, in FIG. 8.
Figure 10:
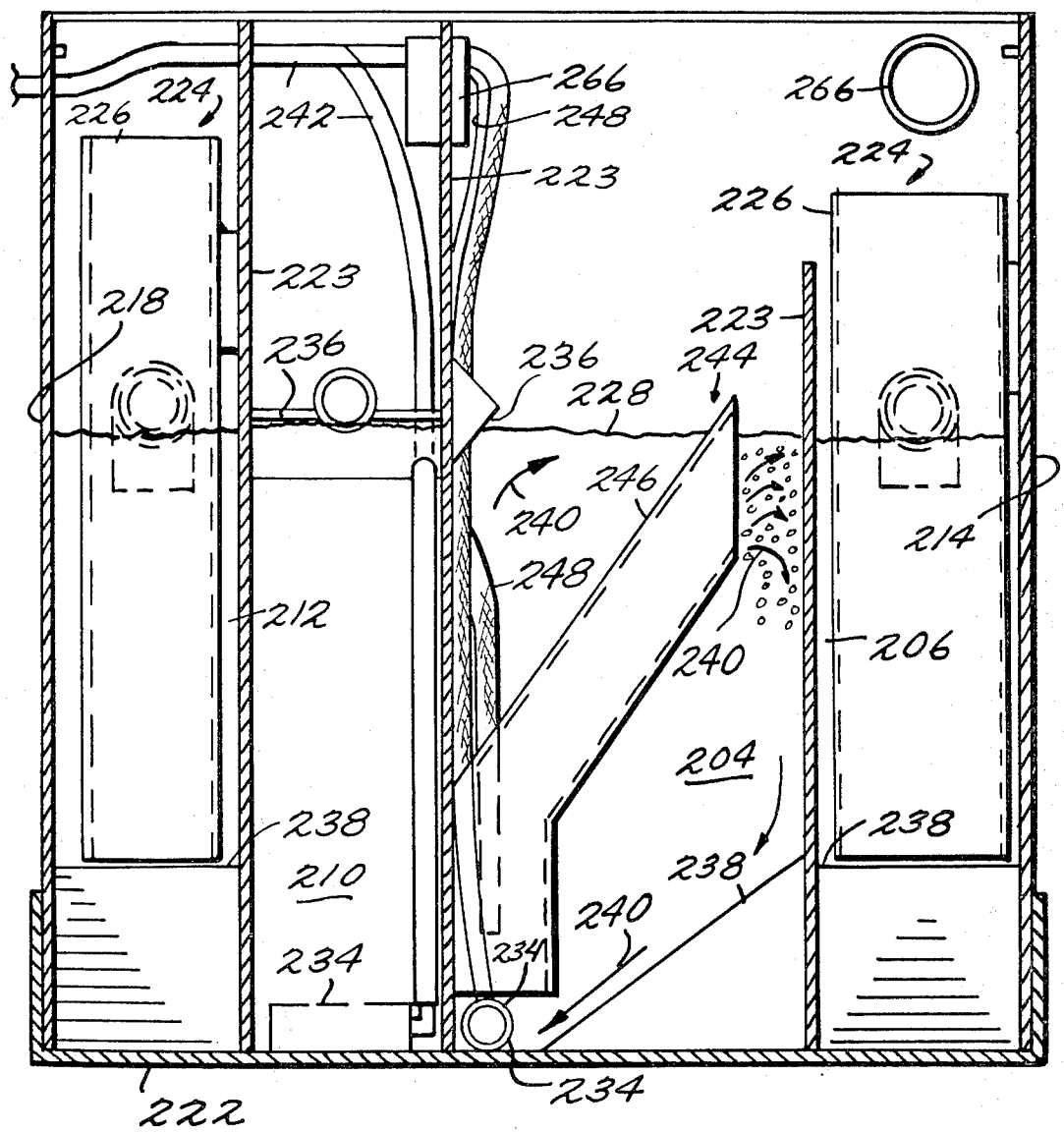
Figure 11:
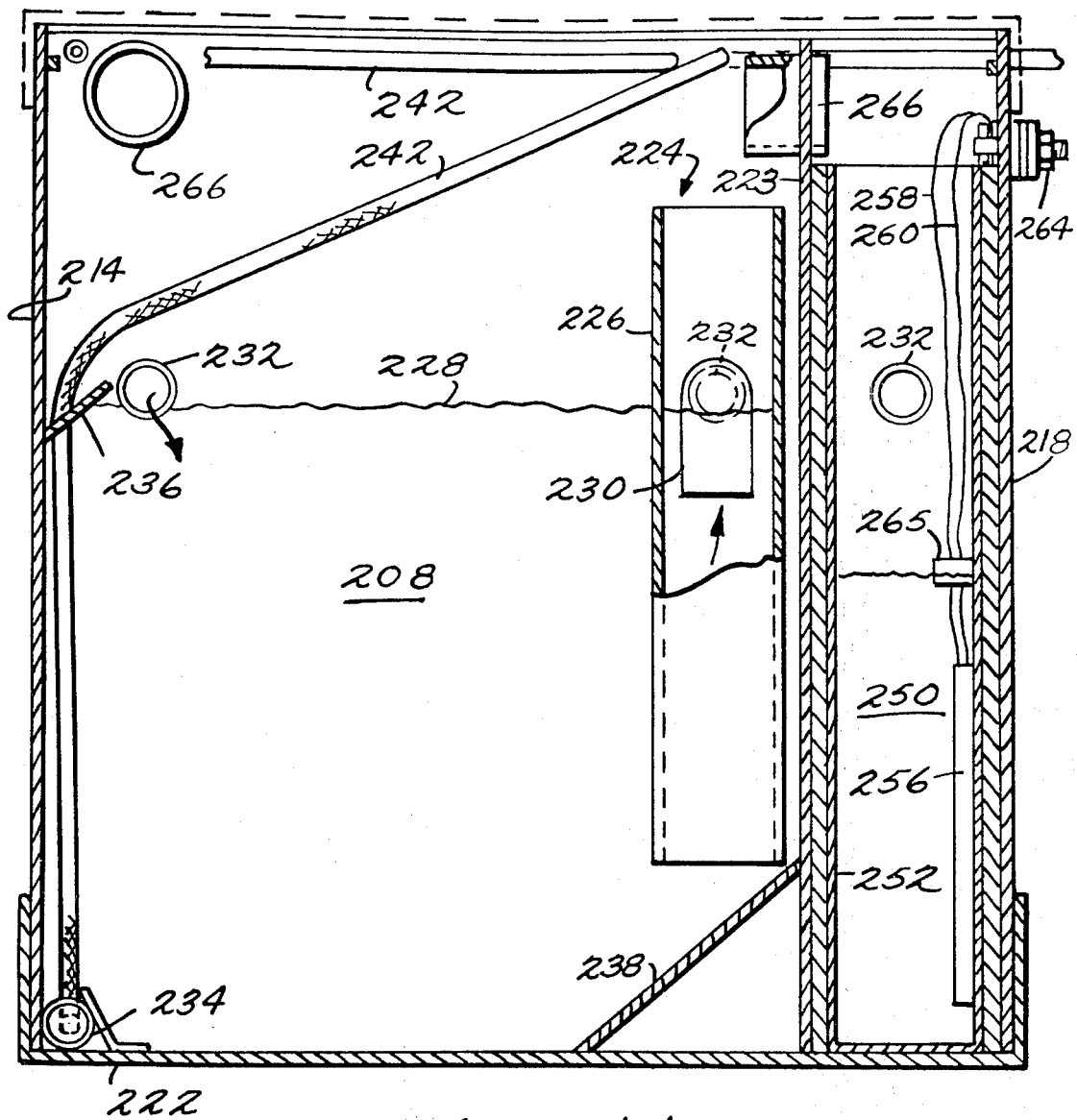

FIG. 8 is a plan view of the toilet 200, with the top removed, illustrating a five-stage unit consisting of a main digestion 204 chamber and four series-connected secondary digestion chambers 207, 208, 210 and 212 contained within side walls 214, 216, 218 and 220 and a bottom wall 222 (FIGS. 9-11). The various chambers are separated from each other by vertical partitions 223. Liquid flow from each chamber to the next downstream chambr takes place only through a quiet chamber assembly 224 which provides for a quiescent volume of liquid from which settleable solids settle so as not to be carried to the next stage. Since it is important to prevent the settling of any solids which may be present, the quiet chamber assemblies 224 are constructed and arranged to continuously return settling solids to the respective upstream treatment stage.

As best seen in FIG. 9 each quiet chamber assembly 224 is disposed within a respective upstream treatment and includes an open-ended vertically disposed settling conduit 226 or the like extending from near the bottom of the chamber to above the level 228 of liquid in that chamber. The volume of the conduit 226 is such that during normal through-put the residence time of liquid in the conduit 226 is sufficient to permit all or substantially all settleable solids to settle by gravity and pass out of the lower end of the conduit 226.

Liquid overflows by gravity to the next downstream treatment chamber through an elbow assembly located near the upper end of each quiet chamber assembly 224. Each elbow assembly includes a vertical portion 230 disposed with within the respective settling conduit 226 and having a lower end below liquid level, and a horizontal portion 232 connecting with the vertical portion 230 and extending through the wall of the conduit 226 and through the respective partition 223.

The liquid in each chamber or stage 204, 206, 208, 210 and 212 is continually supplied with air and is continually mixed to prevent settling of any solids which may be present. Both aeration and mixing are accomplished by introducing air bubbles into the bottom of the respective chamber and by providing an appropriate baffle arrangement by means of which the rising air bubbles and the resulting liquid currents are directed first upwardly, then horizontally and then downwardly so that the overall effect is continuous rolling movement within the entire mass of liquid. A typical arrangement for the chambers is illustrated in FIG. 9 wherein an air diffuser is illustrated at 234 in the chamber 204 and wherein upper and lower flow control baffles are illustrated at 236 and 238, respectively. The arrows 240 show the direction of movement of the liquid. It will be seen that the movement of the liquid below the lower end of the setting conduit 226 is generally downwardly toward the diffuser 234 so that solids settling out of the conduit 226 will be drawn away from the conduit 226 before being directed upwardly by the air bubbles. As seen in FIG. 8 the diffusers 234 are always horizontally spaced from the respective conduits 226.

The air diffusers 234 may be of conventional construction, such as air stones or fabric tubes. Air is supplied to the diffusers 234 through tubes 242 from a suitable air pump (not shown).

The main digestion chamber 204 includes an additional mixing device which aids in breaking up solids in that chamber. As seen in FIG. 10 the device may take the form of an air lift pump 244 which raises liquids and solids from the bottom of the chamber and discharges them near the liquid surface along with air bubbles in generally the same direction as the rolling movement already imparted to the mass of liquid by the air diffuser 234 and the baffles 236 and 238. The air lift pump may be constructed from an open ended tube 246 having a ⅛ bend and provided with a separate air supply tube 248 which terminates inside the lower end of the tube 246. The separate air supply assures that a vigorous pumping and mixing action will be achieved, and the continuous discharge of the pumped contents against the adjacent partition 223 aids in breaking up solids. It will be noted that the diameter of the tube 246 is relatively large, for example 1½ inches, so that large solids will be handled.

The last secondary stage 238 overflows through its respective connection 230, 232 into a relatively small holding stage 250 which is provided with a heating means to slowly evaporate any liquid therein so that there is no discharge of effluent from the overall toilet unit 200. As shown in FIGS. 8 and 11 the stage 250 includes an inner lining 252 which is spaced from the partitions 223 by thermal insulation 254. The heating means may be a resistance heater strip 256 which receives its electric supply from wires 258, 260 connected to a source of current by means of terminals 262, 264 attached to the side wall 218. Control of current to the heater strip 256 may be effected by a switch 265 which is responsive to supply current when the liquid level in the chamber 250 rises to the level of the switch and to interrupt the current when the liquid level drops below the level of the switch.

The spaces above the liquid level in the chambers are preferably vented to atmosphere for the purpose of removing any odor which may develop and especially for the purpose of increasing evaporation from and aeration of the liquid surface in each chamber. To this end the upper portions of the chambers are in series communication so that a sweep of atmospheric air can be passed therethrough. As shown the connections are in the form of short lengths of horizontal tubes 266 which extend through the respective partitions 223. Any of the tubes 266 may also serve as an emergency overflow device in the event that the liquid level in a given chamber rises due to a malfunction. A positive sweep of air through the chambers may be obtained by mounting an air scoop 268 and a rotating turbine vent assembly 270 to the top wall 272 of the toilet, as illustrated schematically in FIG. 9 and as more fully described in application Ser. No. 135,352 the disclosure of which is incorporated by reference.

The toilet 200, like the toilet 10 of FIGS. 1 and 2, amy be fitted with a toilet seat located above the main digestion chamber or with a toilet bowl and flush system as illustrated in FIG. 6.

SUMMARY OF OPERATION

As emphasized previously, the most important feature of the present invention is the achievement of total biochemical digestion of organic waste, without the production of excess slude or the necessity to separate and recycle sludge, by passing the waste through a series of turbulent aerated stages, while preventing passage of settlable solids from stage to stage, so that progressively greater purification occurs in each stage, the last stage thereby containing essentially pure water. The turbulence resulting from continuous agitation within each stage prevents the settling of any solids, including any sludge which is formed, and the filters or quiet chambers between stages prevent the passage of these suspended solids from one stage to the next. Therefore, the liquid which is discharged to any downstream stage has already undergone extensive biochemical treatment, and since no untreated waste enters any of the downstream stages, each downstream stage contains progressively less waste, until in the last stage the waste has been totally converted to carbon dioxide and water. This progressive treatment of previously treated waste while retaining agitating and aerating all suspended solids in any chamber in which they occur is a distinct departure from the typical digestion system in which care is taken to separate sludge and either discharge it entirely or recycle a proportion of it back to the aeration stage.

In the preferred arrangements the system is self-contained in that no liquid is discharged from the last stage as a result of evaporation of liquid in an amount equal to the input to the system over a period of time. The evaporation may occur naturally and/or with the aid of a venting apparatus 268 and 270 as illustrated in FIG. 9 and/or with the aid of a thermal evaporator 256 as illustrated in FIG. 11.

Referring more specifically to the operation of the main digestion stage, and with particular reference to FIGS. 8–11, it will be understood that the internal arrangement accomplishes four functions: (1) it breaks up solids rapidly by virtue of the action of the air lift pump 244 which turbulently discharges large solids and directs them against the adjacent partition 223, (2) it sweeps the floor of the chamber clean toward the diffuser 234 thereby preventing any accumulation of settlable solids in the chamber, (3) it blasts the circulating solids upwardly with air, and (4) it exposes the circulating solids to surface air as they move along the surface of the body of liquid in the chamber. Functions (1) and (2) become more important as the size of the chamber is reduced, because large solids may tend to float permanently at the surface thereby interfering with function (4) or they may tend to sink and pack on the bottom thereby clogging the lower end of the quiet chamber 224 and causing the liquid level in the stage to rise. In actual tests it was found that layering can reduce the working volume of the main chamber by 50% or more in a relatively short time. Function (4) is important in that it increases overall aeration of the liquid and solids thereby reducing the volume of air which must be pumped to the diffuser 234. It has been found that 1 pound of BOD (biological oxygen demand) can be digested with about 600 cubic feet of diffuser air whereas the generally accepted air requirement is about 1500 cubic feet per pound of BOD.

A test of a toilet constructed according to FIGS. 8–11 and having a total volume of 15 gallons of liquid was made. The toilet was placed in a pleasure boat and was used by five persons plus visitors for a prolonged period. It was estimated that 1 pound of BOD per day entered the toilet. An air pump providing 600 cubic feet or air per day was used. After several weeks of normal use of the toilet the stages were tested, and it was found that between the first and fifth stages the BOD and coliform count were reduced by greater than 99%, that the fifth stage was clear and that there was no build-up of solids or sludge requiring removal or recycling thereof.

What is claimed is:

1. A compact toilet facility for the aerobic digestion of organic waste comprising: a main water-containing digestion tank for receiving organic waste in essentially undiluted form; a plurality of secondary digestion tanks; means for connecting said tanks in series at their respective liquid levels for passing liquid free of settleable solids sequentially through said tanks, said means including in each tank a structure which defines a quiet liquid chamber having an opening near the bottom of the respective tank through which settling solids pass from the quiet chamber into the main portion of the respective tank and including a conduit extending from the quiet liquid chamber to the main portion of the next downstream tank; means in the main portion of each tank for continuously aerating the contents of said main portion and for continuously agitating said main portion, said means including air diffuser means near the bottom of the respective tank and baffle means which direct rising air bubbles and liquid currents across the body of liquid near the surface thereof and then downwardly in a continuous rolling movement and then along the bottom of the respective tank toward the diffuser in a manner to move solids settling out of the quiet chamber toward the diffuser; and means for continuously passing a sweep of atmospheric air across the liquid surface in each tank to remove stale diffuser air which has left the liquid and to evaporate a portion of the liquid in each tank.

2. A toilet facility as in claim 1 wherein the structure forming the quiet chamber includes a generally vertical conduit having an open lower end disposed close to a baffle which is inclined downwardly toward the air diffuser.

3. An aerobic digestion system for purifying organic waste material dissolved in or dispersed in water, said system comprising: a main digestion tank having inlet means for receiving organic waste; a plurality of secondary digestion tanks; connecting means including a quiet liquid chamber between tanks for flowing liquid essentially free of floating material and settleable solids sequentially from said main tank through said secondary tanks while retaining in each tank essentially all floating material and settleable solids formed in or transferred to the respective tank and for preventing recirculation of liquid in the opposite direction; said connecting means further including means for transferring any settled solids for each quiet chamber to a digestion tank and means for continuously mixing the contents of each tank to maintain any solids therein in continuous suspension throughout the tank and for continuously aerating the contents of each tank whereby the proportion of organic waste in each tank is less than in the next upstream tank and whereby all settleable solids become aerobically consumed in the secondary digestion tanks.

4. An aerobic digestion system as in claim 3 wherein said connecting means for flowing liquid free to settleable solids sequentially through said tanks includes wall means defining the quiet liquid chamber, and wall means having an opening through which settling solids pass from the quiet chamber into the main portion of the respective tank, said connecting means including a conduit connecting the quiet chamber to the main portion of the next downstream tank.

5. An aerobic digestion system as in claim 3 wherein said mixing means for the contents of each tank includes baffle means and air introducing means arranged so as to continuously circulate the contents of the respective tank in a path along the bottom of the respective tank, up to the surface of the liquid in the respective tank, along that surface and back to the bottom of the respective tank.

6. An aerobic digestion system as in claim 3 including means for evaporating an amount of liquid from said system such that during continuous operation a constant volume of liquid is maintained in said system with the result that there is no liquid flow out of the system.

7. A method for the total aerobic digestion of organic waste without continuously accumulating sludge comprising: receiving the organic waste into a primary digestion chamber containing a body of water; thoroughly agitating and aerating the liquid in said primary chamber to break up solid waste and place it in intimate contact with air; passing overflow increments of liquid essentially free of floating material and settleable solids, upon the addition of further waste, from said primary chamber sequentially to a plurality of secondary digestion chambers while retaining in each chamber essentially all floating material and settleable solids formed in or transferred to the respective chamber and while preventing flow in the opposite direction, continuously mixing the contents of each secondary digestion chamber to maintain any solids therein in continuous suspension throughout the respective chamber and continuously aerating the contents of each secondary digestion chamber to reduce the proportion of organic waste in each chamber with respect to the next upstream chamber and to aerobically consume all settleable solids in the secondary digestion chambers.

8. A method as in claim 7 wherein the step of flowing liquid free of settleable solids sequentially through the chambers includes passing the liquid through a quiet liquid chamber which is disposed between each two digestion chambers and which is in liquid communication with said two digestion chambers so as to allow settling of settleable solids from the liquid, and passing the settled liquids from each quiet chamber to a digestion chamber from which they originated.

9. A method as in claim 7 wherein the step of mixing the contents of each secondary digestion chamber includes circulating the contents of the respective chamber in a path along the bottom of the respective chamber, up to the surface of the liquid in the respective chamber, along that surface and back to the bottom of the respective chamber.

10. A method as in claim 7 including evaporating liquid from the system at approximately the same volume rate that organic waste enters the primary chamber whereby there is no liquid flow from the system.

11. A compact toilet facility for the aerobic digestion of organic waste comprising: a main water-containing digestion tank for receiving organic waste; a plurality of secondary digestion tanks, means for connecting said tanks in series at their respective liquid levels for passing liquid free of settleable solids sequentially through said tanks, said means including in each tank a structure which defines a quiet liquid chamber having an opening near the bottom of the respective tank through which settling solids pass from the quiet chamber into the main portion of the respective tank and including a conduit extending from the quiet liquid chamber to the main portion of the next downstream tank; means in the main portion of each tank for continuously aerating the contents of said main portion and for continuously agitating said main portion, said means including air diffuser means near the bottom of the respective tank and baffle means which direct rising air bubbles and liquid currents across the body of liquid near the surface thereof and then downwardly in a continuous rolling movement and then along the bottom of the respective tank toward the diffuser in a manner to move solids settling out of the quiet chamber toward the diffuser; and means for evaporating an amount of liquid from said toilet facility such that during operation of the facility a constant volume of liquid is maintained in the facility with the result that there is no liquid flow out of the facility.

12. A toilet facility as in claim 11 wherein said evaporating means includes means for passing a sweep of atmospheric air across the liquid surface in each tank.

13. A toilet facility as in claim 11 wherein said evaporating means includes heating means for heating a portion of the liquid in said facility.

* * * * *